Figure 1:
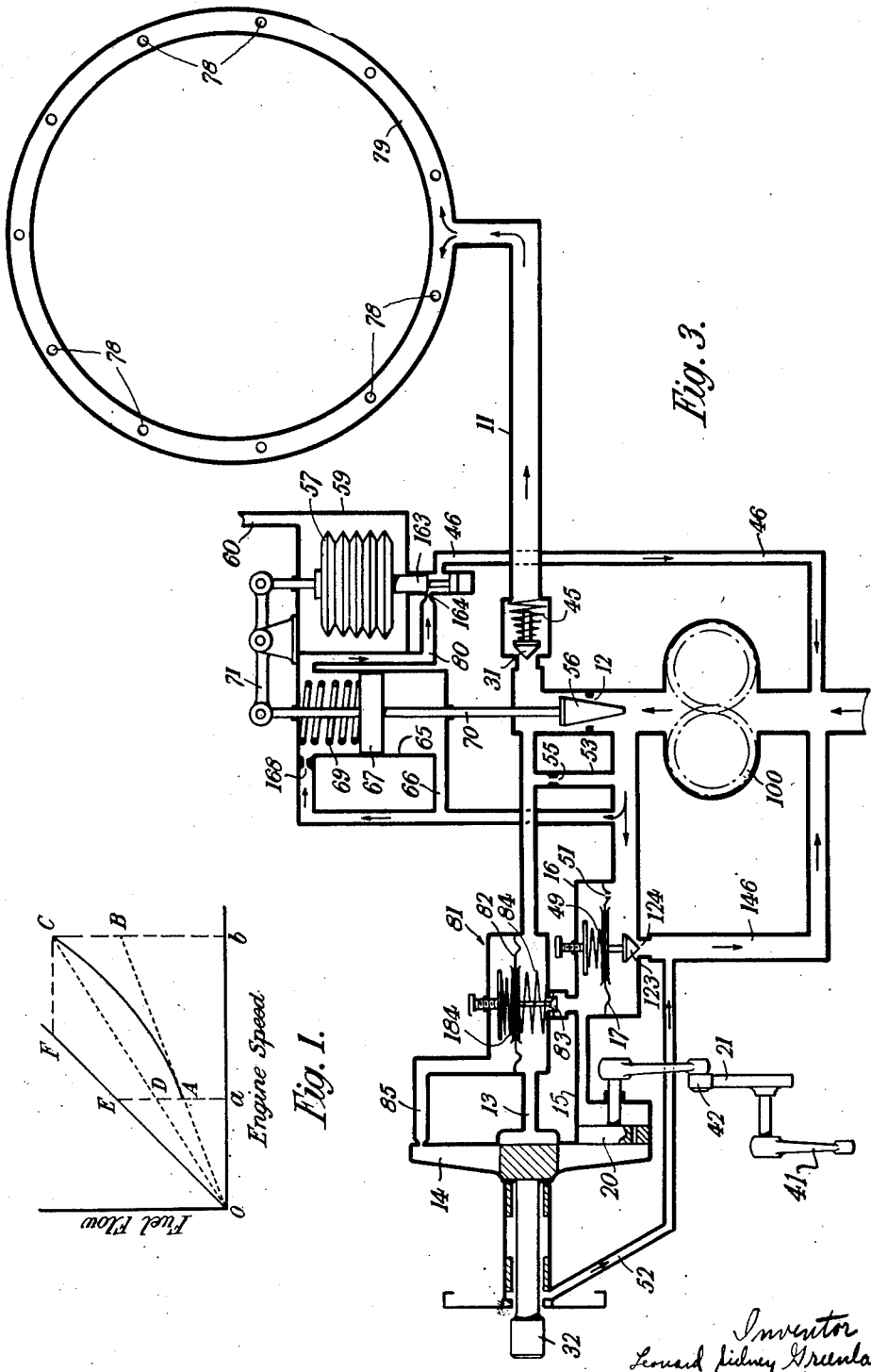

Patented Nov. 4, 1952

2,616,507

UNITED STATES PATENT OFFICE 2,616,507

TURBOPROP CONTROL

Leonard Sidney Greenland, Weston-super-Mare, England, assignor to H. M. Hobson Limited, London, England, a company of Great Britain Application May 14, 1946, Serial No. 669,653
In Great Britain May 28, 1945

12 Claims. (Cl. 170—135.74)

This invention relates to a fuel supply system for an internal combustion engine arranged to drive a constant speed propeller, the speed being selected by a manually operable speed-selecting lever or equivalent member which adjusts the governor of the constant speed propeller and therefore the speed. The object of the invention is to provide means for controlling the supply of fuel to the engine such that during periods of acceleration, while fuel in excess of normal requirements is provided for acceleration, the excess of fuel is controlled.

With continuous combustion turbine engines this feature is particularly desirable since excessive fuel supply can cause overheating and severe damage to the engine. Furthermore, overfuelling can produce surging in the compressor with the attendant risks, particularly in the case of axial type compressors, of stalling the engine. With known systems of fuel control, the need for avoiding these undesirable conditions during acceleration imposes a limit on the speed with which the control lever may be moved to the full power position. Such a limitation can place a pilot of an aircraft at a disadvantage during aerial manoeuvres and may be inadvertently overlooked with serious consequences. The invention enables the control lever to be moved with any speed without risk of overheating to the engine and is therefore especially applicable to combined combustion turbine and constant speed variable pitch propeller installations for use in aircraft. It can, however, be used with advantage with similar installations in boats, or with normal reciprocating engines fitted with constant speed propellers where, for given air intake conditions, the speed (R. P. M.) is related to the rate of fuel supply.

A further advantage of the invention is that during change of engine speed, the difference between fuel supply and normal requirements is progressively diminished and the speed thus brought gradually to the selected value, thereby reducing to a minimum the tendency to overshoot the selected speed.

The fuel supply system according to the invention comprises a fuel pump arranged to feed fuel to the engine through a metering orifice, a governor driven by the engine for maintaining across the metering orifice a fluid pressure difference (hereinafter termed the metering pressure) which is a desired function of engine speed, mechanism associated with the governor and controlled by the speed selecting lever or the equivalent for varying the relationship between engine speed and metering pressure, the metering pressure increasing in relation to engine speed as the lever is moved to select a higher speed and vice versa, and means for varying the effective delivery of the fuel pump in sympathy with variations in the metering pressure.

In the preferred form of the invention, the governor is constituted by an engine driven centrifugal impeller of variable effective outer radius, the pressure difference developed by the impeller being applid across the metering orifice and the speed selecting lever operating to increase the effective outer radius of the impeller when moved to select a higher speed. The pump may be a fixed delivery pump, in which case its effective delivery can be varied by controlling the amount of bleed back of fuel to its suction side. Alternatively it can be a variable delivery pump, the output of which is altered in sympathy with the governor so as to establish a pressure difference across the metering orifice identical with that developed within the impeller.

Figure 2:
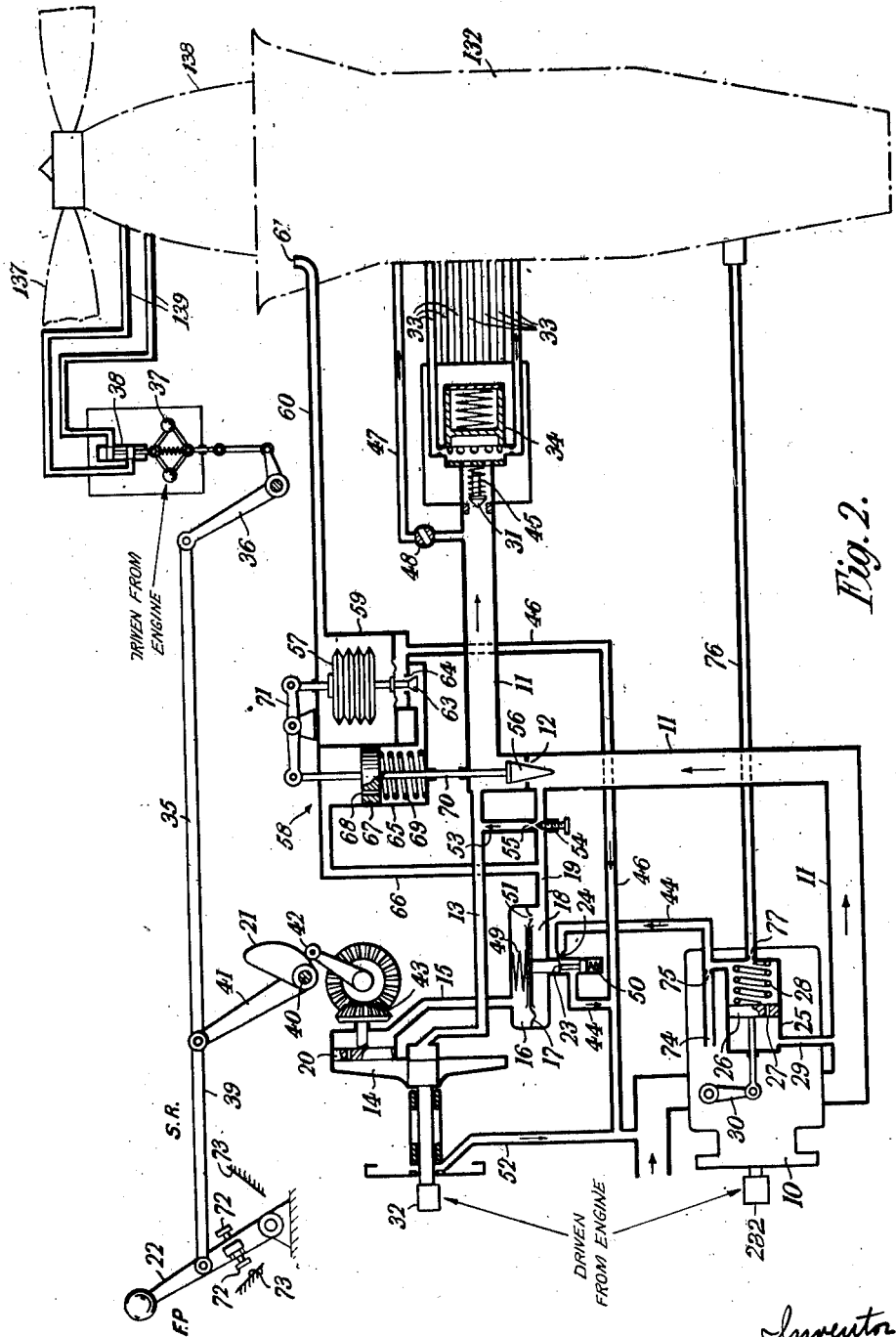

Two specific embodiments of the invention, as applied to a combustion turbine engine for aircraft will now be described in detail, by way of example, with reference to the accompanying drawing, in which:

Fig. 1 is a graph showing the relationship between fuel flow and engine speed for given air intake conditions for a combustion turbine constant speed airscrew unit, according to the invention, Fig. 2 is a diagrammatic showing of the first form of apparatus, and Fig. 3 is a similar diagrammatic showing of the second form of apparatus.

Like reference numerals indicate like parts throughout the figures.

In Fig. 1, the line OAB shows the relationship obtained between fuel flow through a fixed orifice and engine speed with a centrifugal impeller of fixed outer radius. The line AC shows the fuel flow requirements of the engine, at speeds between the values $a$ and $b$ for particular air intake conditions. On movement of the control lever to accelerate from speed $a$ to speed $b$, the fuel flow, if uncontrolled, would follow some such path as AEFC, where OEF represents the maximum output of the pump. This would result in excessive fuel supply to the engine and overheating which would be liable to damage the turbine. With the apparatus according to the invention, however, movement of the control lever to select the higher speed will first alter the datum of the propeller governor and step up the metering pressure from A to D by increasing the radius of the impeller.

The propeller then speeds up, due to the alteration in propeller blade pitch and the excess amount of fuel AD, driving the impeller faster at the new radius. This calls for a higher metering pressure, as speed increases, and this is supplied by the increase in effective delivery of the pump. The fuel flow during the period of acceleration is thus represented by an initial jump from A to D, and thereafter by the line DC. This gives the initial extra fuel required for acceleration, without endangering the turbine, whereafter the fuel flow progressively approaches that represented by the curve AC. The gradual approach to the final value C ensures avoidance of the engine overshooting the desired speed.

On movement of the pilot's lever to decelerate from speed $b$ to speed $a$, the fuel flow drops from C to B, due to reduction in the radius of the impeller, and thereafter follows the line BA, thus again approaching gradually to the final value A.

In the arrangement shown in Fig. 2, fuel is pumped to the injection nozzles by a variable delivery pump 10 along a conduit 11 embodying a metering orifice 12. A pipe 13 connects the downstream side of the metering orifice 12 with the eye of an engine driven centrifugal impeller 14, while a pipe 15 connects the effective outer radius of the impeller to the upper section 16 of a chamber divided into two sections by a diaphragm 17. The lower section 18 of this chamber communicates by a pipe 19 with the upstream side of the metering orifice 12.

The impeller 14 is driven by a gear wheel 32, which although shown displaced from the engine 132 in the diagram of Fig. 2, nevertheless receives a drive from the turbine shaft. The pump 10 is similarly driven from the engine 132 by means of a gear wheel 232. The fuel is fed from conduit 11 to a number of injection nozzles through delivery pipes 33, the variations in hydraulic head in these pipes being controlled at low fuel pressures by a distributing valve 34 of the kind described in United States Patent No. 2,536,440. A conduit 47 having in it a priming cock 48, allows fuel to flow to the engine for starting purposes.

The effective outer radius of the impeller 14 is variable by a valve 20 which is rotated by a cam 21 coupled to the speed selecting lever 22, the shape of the cam determining the relationship between the radius of the impeller and the selected engine speed. The lever 22 is connected, via links 39, 35, and bellcrank 33, to the governor 37 of the constant speed airscrew 137. The governor 37 operates, in known manner, through a servomotor, the control valve 38 of which only is shown, to maintain the airscrew speed at a selected value determined by the position of the lever 22. The servomotor is housed within the hub 138 of the constant speed airscrew 137 and is operated, in known manner, by liquid supplied thereto and discharged therefrom under the control of the valve 38 through pipes 139. The cam 21 turns on a fixed pivot 40 and is operated by an arm 41, its follower 42 communicating rotary movement to the valve 20 through bevel gears 43.

The diaphragm 17 carries a valve 23 which determines the effective area of an orifice 24 in a pipe 44 which allows fuel to flow, via pipe 46, to the suction side of the pump 10 from the right hand end of a servo cylinder 25. Fuel is admitted to the left hand end of the cylinder 25 from the pressure side of the pump 10 by a pipe 29. The cylinder contains a servo piston 26, having a small leakage orifice 27, which piston is held balanced against the fluid pressure difference acting on it by a spring 28. The servo piston 26 is connected to a lever 30 for varying the effective delivery of the pump. A check valve 31, loaded by a spring 45, is provided on the downstream side of the metering orifice 12 for ensuring that there will be sufficient fuel pressure available to work the servomotor under all condition of flow. Balancing springs 49, 50 act respectively on the upper surface of the diaphragm 17 and on the undersurface of the valve 23. The diaphragm 17 has a small leakage orifice 51 for permitting a flow of fuel through the impeller 14. A venting connection 52 is provided from the eye of the impeller 14 to the suction side of the pump 10. In parallel with the metering orifice 12 is a supplementary fuel conduit 53 having in it a tuning jet 55 which is adjustable by a screw 54.

It will be understood that the metering pressure across the orifice 12 is a function of the rotational speed of the impeller 14, the pressure at the downstream side of the orifice 12 being transmitted to the eye of the impeller via pipe 13, and that at the upstream side of the metering orifice being applied to the undersurface of the diaphragm 17 and balanced by the impeller tip pressure applied to the supper surface of the diaphragm. The diaphragm 17, through the agency of valve 23, regulates the pressure difference across the servo piston 26 in such a way that the output of the pump 10 will equalise the pressures on the two sides of the diaphragm 17. When this condition is obtained the metering pressure is equal to the pressure difference across the impeller.

Assuming the lever 22 is moved to select a higher speed, the resultant increase of radius of the impeller causes downward movement of the diaphragm 17, moving the valve 23 to reduce the area of orifice 24 and cause a build up in pressure at the right hand end of the cylinder 25. The servo piston 26 then moves to the left, thereby actuating lever 30 to increase the delivery of the pump 10. The alteration of propeller pitch and the fuel in excess of normal engine requirements (as indicated by the zone ADC) cause the engine to accelerate until it reaches the selected speed where it again comes under the influence of the propeller governor and the fuel flow has reached the value appropriate to the new speed.

Similarly, on selection of a lower speed, diaphragm 17 moves up, raising valve 23. This reduces the metering pressure, and moves the servo piston 26 to the right to reduce the delivery of the pump 10.

For a given impeller tip radius and area of the metering orifice the fuel flow into the engine will be in linear relation with the rotational speed of the engine, because the pressure difference developed within the impeller varies as the square of the speed and the flow through the orifice 12 varies as the square root of the pressure drop across it. However, the relation between fuel flow and speed is required to be a curve such as AC in Fig. 1, and this requirement is met by arranging for the impeller tip radius to increase as the lever 22 is moved to select a higher speed. By suitable shaping of the cam 21 any desired relation, within limits, between fuel flow and speed can be obtained for given air intake conditions. As later explained, adjustment of the flow to suit changes in air intake conditions is effected by altering the area of the metering orifice 12. The lever 22 carries adjustable stop screws 72 which coact with fixed surfaces 73 to define the minimum and maximum R. P. M. at the low running (S. R.) and full power (F. P.) positions respectively of the lever. Alternatively this adjustment may be effected by adjustable lobes on the cam 21.

The area of the metering orifice 12 is varied as a function of the air entry pressure, i. e. air pressure at the entry of the compressor, by means of a needle valve 56, the position of which is controlled by a stack of capsules 57 through the agency of a servomotor 58. The capsule stack 57 is disposed in a chamber 59 to the interior of which the air entry pressure is applied by a pipe 60 having a forwardly facing end 61. The stack 57 controls, according to its state of expansion or contraction, the position of a valve 63 which controls the effective area of an outlet 64 from the lower end of a servo cylinder 65 to pipe 46 which, it will be recalled, leads to the suction side of the pump 10. Fluid under pressure is supplied from the upstream side of the metering orifice 12 to the upper end of cylinder 65 through a pipe 66. The servo piston 67, which has in it a small orifice 68, is held balanced against the fluid pressure difference acting on it by a spring 69. The piston 67 is connected to the needle valve 56 by a rod 70 and to the capsule stack 57 by a follow up link 71. On increase in the air entry pressure, the valve 63 will be lifted to decrease the area of outlet 64 with the result that the piston 67 will move up to increase the effective area of the metering orifice 12. Conversely, decrease in the air entry pressure will cause valve 64 to move down, so that the servo piston 67 will likewise move down to decrease the effective area of the metering orifice 12.

A normally closed spill line 74, containing a restriction 75, communicates with the right hand end of the cylinder 25. In case the engine should overspeed, this line 74 is opened by an overspeed device (not shown) to allow the piston 26 to move to right to decrease the fuel flow to the engine. Variation in engine speed from any selected value will generally be corrected by the governor 37 associated with the variable pitch airscrew, but under maximum speed conditions any increase in speed above the selected value would be likely to damage the engine, and it is for this reason that the overspeed corrector is introduced since its effect in decreasing the fuel flow will assist the governor 37 in correcting any tendency to overspeed under conditions when that tendency would be dangerous. Another normally closed spill line 76, containing a restriction 77 communicates with the right hand end of the cylinder 25. A maximum temperature override device (not shown) opens this line 76, should the turbine temperature exceed a permissible limit, to allow piston 26 to move to the right to decrease the fuel flow to the engine.

The valve 23 can, if desired, be replaced by a piston type valve controlling pressure and exhaust connections to the servo cylinder, upward movement of the piston valve from its neutral position connecting the right hand end of the servo cylinder to exhaust and the left hand end to pressure, and downward movement of the piston valve reversing these connections to the cylinder, thus enabling the servo piston to make a sympathetic movement to correct the fuel flow.

It is to be understood moreover that either of the two servomotors can, if desired, be operated by hydraulic fluid not derived from the fuel supply.

The arrangement shown in Fig. 3 is similar in its essentials to that shown in Fig. 2, but in this case a fixed delivery fuel pump 100 is used, and the diaphragm 17 operates a valve 123 for varying the bleed back of fuel, through a variable area orifice 124 and pipe 146, from the delivery to the suction side of the pump 100. The individual fuel nozzles of Fig. 2 are replaced by burners 78 spaced around a distributing gallery 79 to which the fuel is fed by the pipe 11. The servomotor is reversed as compared with that of Fig. 2 in that the spring 69 acts on the upper surface of the piston 67 and pressure fuel is supplied to the lower end of the cylinder by the pipe 66, a conduit 80 leading from the upper and low pressure end of the cylinder to the outlet 164 to pipe 46. The valve 163 controlling the area of outlet 164 is also reversed as compared with valve 63 of Fig. 2. As before, the increase in air entry pressure will increase the area of the metering orifice 12, in this case due to valve 163 increasing the area of the orifice 164 and so causing the piston 67 to move up, while the reverse action will take place when the air entry pressure falls. A restriction 168 in this case replaces the restricted orifice 68 in the piston 67 of Fig. 2.

The diaphragm 17 regulates the position of the pump relief valve 123, so that the effective delivery of the pump will be such as to produce the required metering pressure across the orifice 12, this metering pressure being altered as lever 41 is moved, due to the variation in the radius of discharge of the impeller 14 by the valve 20.

The apparatus embodies an overspeed corrector 81. This comprises a diaphragm 82 coupled to a valve 83 and loaded by springs 84, 184. The impeller eye pressure is applied to the undersurface of diaphragm 82 through the pipe 13, and the impeller tip pressure is applied to the upper surface of the diaphragm through a pipe 85. Normally the spring 84 is effective to overcome this pressure difference and the pressure applied to the upper surface of the diaphragm by the spring 184, with the result that the valve 83 is held closed. Should however, the engine overspeed to a sufficient extent, the increase in pressure difference developed by the impeller overcomes the spring 84, depressing the diaphragm 82 and so opening valve 83. This allows part of the fuel from upper chamber section 16 to bleed to the downstream side of the orifice 12, and so reduces the metering pressure and therefore the fuel flow.

Instead of employing a variable radius impeller, I may, in either of the above embodiments, employ a fixed radius impeller and arrange for variation in the relationship between engine speed and the metering pressure established across the metering orifice by the impeller, as described in United States application Serial No. 663,180 by providing a conduit external to the impeller and connecting the eye and tip thereof, and arranging for movement of the speed-selecting lever to operate a valve for adjusting the effective area of an orifice in that conduit.

What I claim as my invention and desire to secure by Letters Patent is:

1. In an internal combustion engine arranged to drive a constant speed propeller and having a manually operable speed selecting member for adjusting a governor associated with the constant speed propeller and thereby varying the engine speed, the combination of a fuel pump arranged to feed fuel to the engine through a metering orifice, an engine-driven centrifugal impeller, means for applying across the metering orifice the pressure difference developed by said impeller, and means operable by the speed-selecting member for varying the effective outer radius of said impeller, said outer radius increasing as said speed selecting member is moved to select a higher speed and vice versa, and means for automatically varying the effective delivery of the fuel pump to adjust the same to variations in the pressure difference across the metering orifice.

2. In an internal combustion engine arranged to drive a constant speed propeller and having a manually operable speed selecting member for adjusting a governor associated with the constant speed propeller and thereby varying the engine speed, the combination of a fuel pump, a fuel delivery pipe for feeding fuel from the pump to the engine, said pipe including a metering orifice, an engine driven centrifugal impeller of variable effective outer radius having its eye connected to the fuel delivery pipe on the downstream side of the metering orifice, a diaphragm exposed on one side to the pressure in the fuel delivery pipe on the upstream side of the metering orifice and at the other side to the impeller tip pressure, a valve controlled as to position by the diaphragm and arranged to regulate the effective delivery of the fuel pump so that it establishes across the metering orifice a pressure difference equal to that developed within the impeller, and means operated by the speed selecting member for varying the effective outer radius of the impeller on movement of said member, said radius being increased as the selected speed is increased.

3. Apparatus as claimed in claim 2, in which the pump is a fixed delivery pump and the valve is a relief valve for controlling bleed back of fuel from the delivery to the suction side of the pump.

4. Apparatus as claimed in claim 2, in which the pump is a variable delivery pump and comprising a servomotor operated by the valve and arranged to control the delivery of the pump to establish the required metering pressure.

5. In an internal combustion engine arranged to drive a constant speed propeller and having a manually operable speed selecting member for adjusting a governor associated with the constant speed propeller and thereby varying the engine speed, the combination of a fuel pump, a fuel delivery pipe for feeding fuel from the pump to the engine, said pipe including a metering orifice, means for effecting variation in the area of said orifice as a desired function of air entry pressure, an engine driven centrifugal impeller of variable effective outer radius having its eye connected to the fuel delivery pipe on the downstream side of the metering orifice, a diaphragm exposed on one side to the pressure in the fuel delivery pipe on the upstream side of the metering orifice and at the other side to the impeller tip pressure, a valve controlled as to position by the diaphragm and arranged to regulate the effective delivery of the fuel pump so that it establishes across the metering orifice a pressure difference equal to that developed within the impeller, and means operated by the speed selecting member for varying the effective outer radius of the impeller on movement of said member, said radius being increased as the selected speed is increased.

6. Apparatus as claimed in claim 5, comprising an override device operable in case of overspeeding of the engine to override the control action of the impeller and reduce the fuel flow to the engine.

7. In an internal combustion engine arranged to drive a constant speed propeller and having a manually operable speed selecting member for adjusting a governor associated with the constant speed propeller and thereby varying the engine speed, the combination of a fuel pump, a fuel delivery pipe for feeding fuel from the pump to the engine, said pipe including a metering orifice, a needle valve for controlling the effective area of the metering orifice, a pressure sensitive device exposed to air entry pressure, a servomotor for adjusting the position of said needle valve under the control of said pressure sensitive device, an engine driven centrifugal impeller of variable effective outer radius having its eye connected to the fuel delivery pipe on the downstream side of the metering orifice, a diaphragm exposed on one side to the pressure in the fuel delivery pipe on the upstream side of the metering orifice and at the other side to the impeller tip pressure, a valve controlled as to position by the diaphragm and arranged to regulate the effective delivery of the fuel pump so that it establishes across the metering orifice a pressure difference equal to that developed within the impeller, and means operated by the speed selecting member for varying the effective outer radius of the impeller on movement of said member, said radius being increased as the selected speed is increased.

8. In an internal combustion engine, the combination, with a constant speed propeller driven by the engine, and a propeller governor associated with the constant speed propeller, means for adjusting the propeller governor to vary the engine speed which will be maintained by the constant speed propeller, a manually operable speed selecting member, a fuel pump, a conduit for supplying fuel to the engine from said fuel pump, a metering orifice in said conduit, a metering pressure governor driven by the engine and tending to develop across the metering orifice a metering pressure which increases in desired relationship with increase in engine speed, mechanism for varying the datum of said metering pressure governor and thereby altering the relationship between the metering pressure and the engine speed, mechanism operated by the speed selecting member for simultaneously actuating the propeller governor adjusting means and the datum-varying mechanism to effect, as said member is moved to select a higher or lower speed, a controlled increase or decrease respectively in the metering pressure additional to that obtained by the normal response of said metering pressure governor to change in engine speed, and means responsive to changes in the metering pressure developed by said metering pressure governor for automatically increasing the effective delivery of the fuel pump as said metering pressure increases, and decreasing the effective delivery of the fuel pump as said metering pressure decreases.

9. Apparatus as claimed in claim 8, in which the metering pressure governor is an engine driven centrifugal impeller, and comprising means for applying the pressure difference developed by the impeller across the metering orifice, the datum-varying mechanism serving to vary, as said member is moved, the relationship between engine speed and the pressure difference so developed.

10. In an internal combustion engine, the combination, with a constant speed propeller driven by the engine, of a propeller governor associated with the constant speed propeller, means for adjusting the propeller governor to vary the engine speed which will be maintained by the constant speed propeller, a manually operable speed selecting member, a fixed delivery fuel pump, a conduit for supplying fuel to the engine from said fuel pump, a metering orifice in said conduit, a bleed pipe for bleeding fuel from said conduit, a relief valve for controlling the flow of fuel through said bleed pipe, a metering pressure governor driven by the engine and tending to develop across the metering orifice a metering pressure which increases in desired relationship with increase in engine speed, mechanism for varying the datum of said metering pressure governor and thereby altering the relationship between the metering pressure and the engine speed, mechanism operated by the speed selecting member for simultaneously actuating the propeller governor adjusting means and the datum-varying mechanism to effect, as said member is moved to select a higher or lower speed, a controlled increase or decrease respectively in the metering pressure additional to that obtained by the normal response of said metering pressure governor to change in engine speed, and means responsive to changes in the metering pressure developed by said metering pressure governor for actuating said relief valve so as to reduce the flow of fuel through said bleed pipe as said metering pressure increases and to increase the flow of fuel through said bleed pipe as said metering pressure decreases.

11. In an internal combustion engine, the combination, with a constant speed propeller driven by the engine, of a propeller governor associated with the constant speed propeller, means for adjusting the propeller governor to vary the engine speed which will be maintained by the constant speed propeller, a manually operable speed selecting member, a fuel pump, a conduit for supplying fuel to the engine from said fuel pump, a metering orifice in said conduit, a metering pressure governor driven by the engine and tending to develop across the metering orifice a metering pressure which increases in desired relationship with increase in engine speed, mechanism for varying the datum of said metering pressure governor and thereby altering the relationship between the metering pressure and the engine speed, a linkage operable by the speed selecting member to actuate the propeller governor adjustment means, a cam coupled to operable by said linkage for actuating the datum varying mechanism to effect, as said member is moved to select a higher or lower speed, a controlled increase or decrease respectively in the metering pressure additional to that obtained by the normal response of said metering pressure governor to change in engine speed, and means responsive to changes in the metering pressure developed by said metering pressure governor for automatically increasing the effective delivery of the fuel pump as said metering pressure increases, and decreasing the effective delivery of the fuel pump as said metering pressure decreases.

12. In an internal combustion engine arranged to drive a constant speed propeller and having a manually operable speed selecting member for adjusting a governor associated with the constant speed propeller and thereby varying the engine speed, the combination of a fuel pump, a fuel delivery pipe for feeding fuel from the pump to the engine, said pipe including a metering orifice, an engine driven centrifugal impeller having its eye connected to the fuel delivery pipe on the downstream side of the metering orifice, a diaphragm exposed on one side to the pressure in the fuel delivery pipe on the upstream side of the metering orifice and at the other side to the impeller tip pressure, a valve controlled as to position by the diaphragm and arranged to regulate the effective delivery of the fuel pump so that it establishes across the metering orifice a pressure difference equal to that developed within the impeller, and means controlled by the speed selecting means for varying the relationship between engine speed and the pressure difference established by said impeller across said diaphragm, said pressure difference being increased as the selected speed is increased.

LEONARD SIDNEY GREENLAND.

REFERENCES CITED

The following references are of record in the file of this patent:

UNITED STATES PATENTS

| Number | Name | Date |
| --- | --- | --- |
| 2,187,120 | Gosslau et al. | Jan. 16, 1940 |
| 2,346,916 | Halford et al. | Apr. 18, 1944 |
| 2,374,844 | Stokes | May 1, 1945 |
| 2,378,037 | Reggio | June 12, 1945 |
| 2,405,888 | Holley, Jr. | Aug. 13, 1946 |
| 2,412,360 | Schom | Dec. 10, 1946 |
| 2,419,171 | Simpson et al. | Apr. 15, 1947 |
| 2,438,663 | Greenland | Mar. 30, 1948 |
| 2,440,567 | Armstrong et al. | Apr. 27, 1948 |